(12) United States Patent
Fairbanks

(10) Patent No.: US 8,453,602 B2
(45) Date of Patent: Jun. 4, 2013

(54) COMBINATION STORAGE, DISPENSING AND FEEDING DEVICE FOR DOMESTIC ANIMALS

(76) Inventor: Putnam Reid Fairbanks, Thousand Oaks, CA (US)

(*) Notice: Subject to any disclaimer, the term of this patent is extended or adjusted under 35 U.S.C. 154(b) by 96 days.

(21) Appl. No.: 12/930,982

(22) Filed: Jan. 21, 2011

(65) Prior Publication Data

US 2011/0283946 A1 Nov. 24, 2011

Related U.S. Application Data

(60) Provisional application No. 61/396,236, filed on May 24, 2010.

(51) Int. Cl.
*A01K 1/10* (2006.01)
*A01K 5/00* (2006.01)
*A01K 5/01* (2006.01)
*A01K 39/00* (2006.01)

(52) U.S. Cl.
USPC ....................................................... 119/61.5

(58) Field of Classification Search
USPC ............ 119/61.5, 61.51, 61.52, 61.53, 61.54, 119/61.55, 61.56
See application file for complete search history.

(56) References Cited

U.S. PATENT DOCUMENTS

| 5,445,110 | A | * | 8/1995 | Birnie | ........................ 119/61.5 |
| 7,392,761 | B2 | | 7/2008 | Kujawa et al. | |
| 7,441,514 | B2 | | 10/2008 | Dana et al. | |

* cited by examiner

*Primary Examiner* — Monica Williams
(74) *Attorney, Agent, or Firm* — John K. Buche; Buche & Associates, PC

(57) ABSTRACT

A feeding device that is comprised of an outer containment module and inner compression device, so configured that a multiplicity of disposable liners can be nested within the device and then be individually dispensed as required for each new feeding. The disposable liners are held inside the bowl without need for mechanical hinges, moving rims or retaining devices, but rather by a very careful cooperation between the size of the liners and an inwardly extending retaining flange or lip on the top inner edge of the containment module. This unique design allows the user to simply press liners into the device or peel them out, whenever the circumstances require it. The compression device in the bottom of the containment module supports the liners and continuously keeps the supply of disposable liners conveniently staged at the top edge of the module, as well as keeps them from moving during feedings.

16 Claims, 2 Drawing Sheets

COMBINATION STORAGE, DISPENSING AND FEEDING DEVICE FOR DOMESTIC ANIMALS

CROSS-REFERENCE TO RELATED APPLICATIONS

This application claims the benefit of provisional patent application Ser. No. 61/396,236 filed 2010 May 24 by the present inventor.

BACKGROUND

Prior Art

The following is a tabulation of some prior art that presently appears relevant:

| U.S. Patents | | | |
|---|---|---|---|
| Pat. No. | Kind Code | Issue Date | Patentee |
| 7,392,761 | | 2008-07-1 | Kujawa, et al. |
| 7,441,514 | | 2008-10-28 | Dana, et al. |

Traditionally pet owners and other keepers of animals have been faced with the problem of regularly maintaining the sanitation of dishes, plates and bowls in which they serve food for their domestic animals. More specifically, the 'wet' foods they serve have the stubborn propensity to stick to the feeding surface like glue, in between feedings. Cleaning these surfaces has always been an onerous process. Industry has recognized this frustration and responded by creating countless 'dry' products which are essentially pelletized grains with flavoring added. Unfortunately these products deprive the animals of dietary variety, nutrition, or both. As an example, cats are recognized by biologists, and described by them, as Obligate Carnivores. They must eat whole food as they would in the wild for, among other reasons, that is their primary source of liquids. Over the years individuals have recognized the above shortcomings and have attempted different solutions to provide disposable feeding surfaces that would remove the burden of daily cleaning of food dishes.

The interest in developing a combination dispenser of disposable inserts and a feeding platform for domestic animals has been with us for quite a few years. Many individuals have contributed to the evolution of such a device; however the latest, most advanced and evolved solutions to all the design ideals one might ask for are found in U.S. Pat. No. 7,441,514 and U.S. Pat. No. 7,392,761.

U.S. Pat. No. 7,441,514 proposes the usual combination of outer dish with inserts or liners. The main body of the inserts is nested within the dish. The inserts, however, have outwardly extending flanges at their top so that when inserts are nested within the dish, their flanges rest atop of, outside of, and are supported by the exterior wall of the dish. Because of this arrangement the inventors then have to resort to an external means to secure the inserts to the outer dish. Towards that end they have proposed a series of movable and unmovable retaining elements to trap inserts in place. These are external add-ons to the outer dish. Two of the retaining elements are simply 'stops' that limit lateral movement of the dishes. While these two elements restrain gross lateral movement of the inserts, the inventors recognized they would not stop inserts from spinning during feeding. The third retaining element, therefore, has a clasping function and added 'anti-spin' prongs to keep the inserts from spinning within the outer dish. While that seems useful, a major latent flaw in this design is that it fails to provide adequate means for its retaining elements to successfully retain a stack of inserts that is always changing in height every time a used liner is discarded. The same clamps and anti-spin prongs that retain a large number of inserts in position will not be equally successful in retaining a single insert in position without added provisions. Those provisions are conspicuously not to be found in their patent.

As will be seen, this design is vastly more complicated than it needs to be, and vastly more complicated than the device disclosed by the present patent application. The inventor requires 8 pages of drawings and more than 60 views and images to adequately capture all the complexities of the design. A full 18 of the inventor's 20 claims are devoted simply to the design of the retaining elements alone. The present patent application will show that none of this is necessary. The compressive device supporting the liners against the retaining lip detailed in the present application holds any number of liners firmly in place without any movement. Complexity adds increased manufacturing burden and prohibitive costs.

Not only is complexity a manufacturing and cost negativity in this design, but the moving parts used herein will always have a greater propensity for failure than static or non-moving parts. Another liability of this device is the added complication, dexterity, and effort required of user in having to mechanically disengage and then reengage retaining element each and every time a liner needs to be disposed of. Still another fault of this device is that the uppermost edges of all the inserts lay atop and outside of the outer dish, and will always be susceptible of food spillage and contamination from previous feedings. That raises serious sanitation and aesthetic concerns.

The last flaw uncovered by a careful reading of this patent is that the inventor declares it is a primary objective of his design to accept conventional, readily available liners from a number of pre-existing supply sources. That means that the success or failure of his device will always be subject to the design and configuration of presently available liners and the whim of those who supply them. Unfortunately that limitation precludes all kinds of possible other designs imagined by the manufacturer of the device proposed in the present patent application.

U.S. Pat. No. 7,392,761 discloses a pet dish apparatus that includes a spring loaded retaining base; within which sits a permanent liner-positioning bowl. Disposable inserts are to be nested in this inner bowl and a ring-like rim hinge and latch on top of the base unit is necessary in order to keep inner bowl and inserts in place within retaining base. While the introduction of a spring loaded base suggests an advancement on the prior art, it falls short. Too many of the other features presented herein detract from the invention's overall effectiveness and financial viability.

As with the previously discussed patent, the externally added hinge, latch and retaining ring all add needless complexity and cost to the manufacturing, marketing, mass acceptance and even use of this invention. Again, there is the same need here for the user to each and every time disengage a latch, and lift hinged rim at every feeding in order to dispose of each used insert. Again, the same need to then reposition rim and re-engage lock is wearisome and adds needless dexterity and effort to the use of the device.

The insistence upon a spring of uniform pitch from base to its top in order to support inserts again adds more engineering and manufacturing complexity, as well as needless costs. The present patent application suggests that a simple piece of rubberized foam accomplishes the same effect without all of the drawbacks.

Still another flaw, the inclusion of a permanent bowl within the outer bowl, to be used as a necessary means to keep disposable inserts horizontally aligned to the outer retaining base, is another claim that makes no engineering, commercial or practical sense. It only hurts the viability of the product. Not only that, it fails by its own design. Drawings show the inventor proposed an inner tapered permanent bowl residing inside of a larger tapered retaining base. As inserts are used and discarded, and as the spring loaded permanent bowl begins to arise accordingly, the tapered match between the permanent bowl and the retaining base is totally lost. Along with it, the lateral stability between the permanent bowl with inserts, and the retaining base envisioned by the inventor, is equally lost. That is why car engine cylinders and pistons are specifically designed with matching straight shafts.

Finally, this invention calls for extraction tabs on each of the disposable inserts in order to aid removal of used inserts. This only adds more manufacturing complexity and cost. The device proposed by the present patent application requires only a simple, no-cost thumb notch in the outer dish to allow simple peeling off of the used inserts.

SUMMARY OF THE INVENTION

In view of the foregoing disadvantages inherent in the known types of pet feeding dishes represented by the prior art, the invention in the present application seeks to create a new pet feeding device. This device will have many of the advantages of the pet feeding dishes disclosed heretofore as well as novel features that remove disadvantages of previous inventions and result in a pet feeding system which is not anticipated, rendered obvious, suggested, or even implied by any of the prior art, either alone or in any combination thereof.

Towards this end, the present invention is comprised of an outer container approximating the shape of a bowl, having a bottom, walls, upper periphery, an open cavity within its walls, and a permanent retaining lip or flange extending inwardly near the top of upper periphery. This outer container will accommodate within it a plurality of liners stacked inside of each other in a vertical array. Each of the liners has an inner surface, an outer surface, and an upper periphery. The plurality of liners is positioned and nested within the inner cavity of the bowl and held in horizontal alignment by the inner walls of the container itself. Finally a compressive devise is positioned within the bowl below the nested liners, and supports said liners firmly against the retaining lip of said container so that no insert can move during feedings.

There has thus been outlined, rather broadly, the more important features of the inventions in order that the detailed description that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the concepts, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DRAWINGS

Figures

The invention will be better understood and objects, other than those set forth above, will become apparent when consideration is given to the following detailed description thereof. Such description makes reference to the annexed drawings wherein.

The same reference numerals refer to the same part throughout the various Figures.

DESCRIPTION OF THE PREFERRED EMBODIMENT

Figure 1:
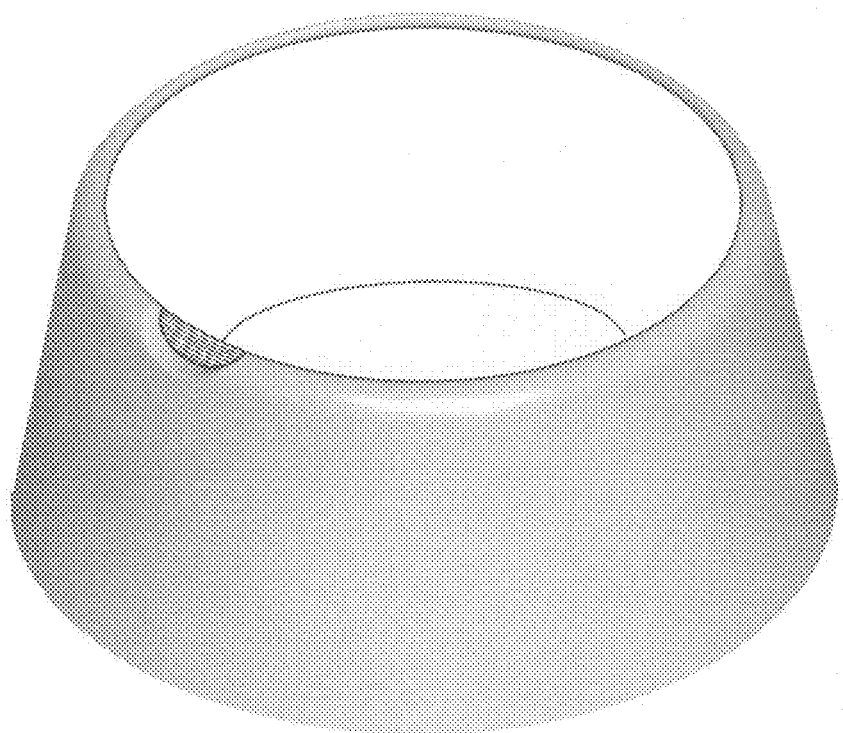
FIG. 1 is a perspective view of the preferred embodiment of the new and improved pet feeding system with disposable inserts constructed in accordance with the principles of the present invention.
Figure 2:
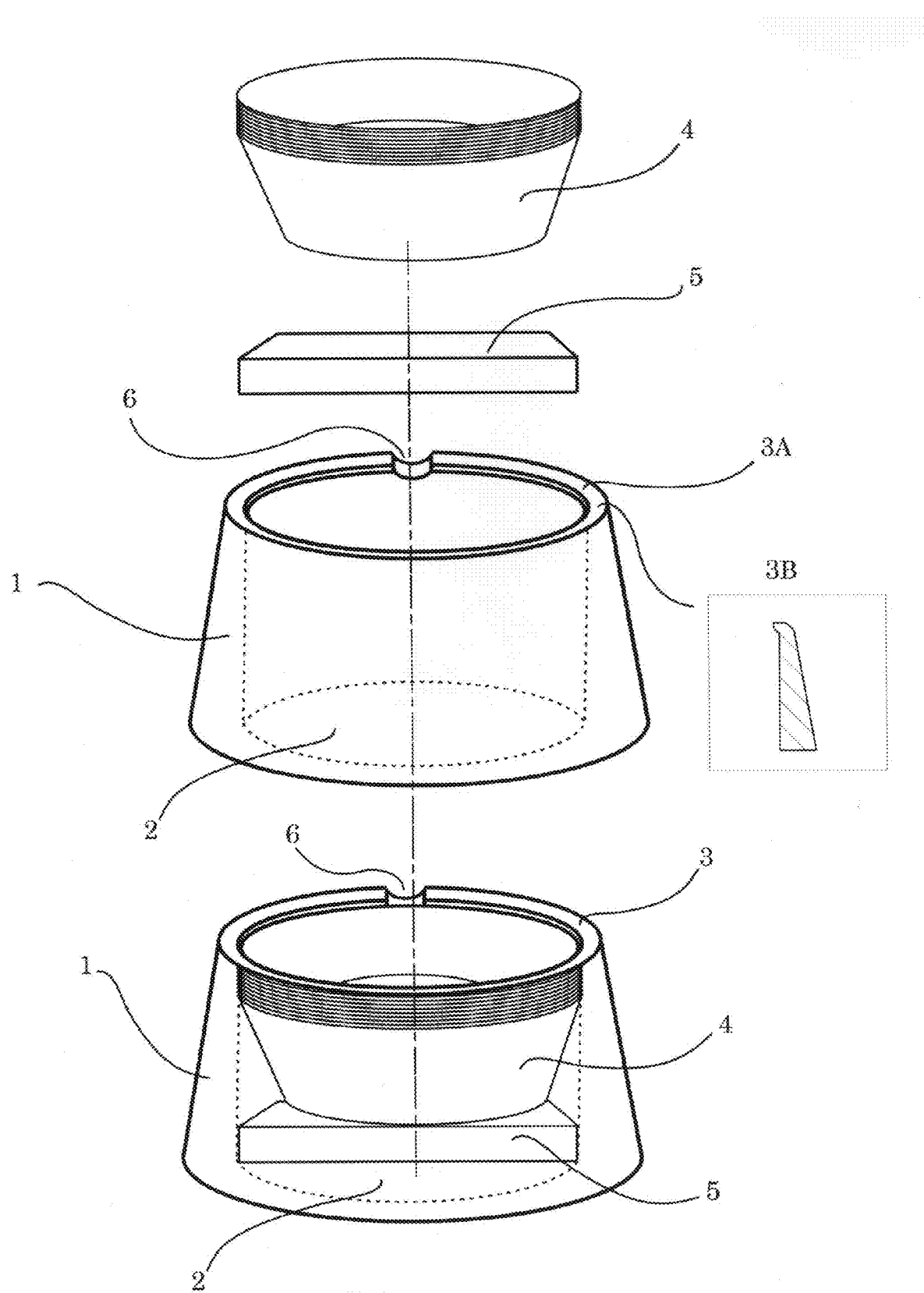
FIG. 2 is an exploded perspective view of the pet feeding dish of the prior FIG. 1.

With reference now to the drawings, and in particular to FIG. 2, images 1 through 6 thereof, a new pet feeding device with disposable inserts embodying the principles and concepts of the present invention and herein after designated by the reference numeral 10 will be described.

Specifically, it will be noted that the new and improved pet feeding device 10 with disposable inserts comprises, in its broadest context, a plurality of components including a bowl, a compressive device, and a multiplicity of liners. Such components are individually configured and correlated one with respect to the other to attain the desired objective.

More specifically, the bowl 1 has an inner surface, and outer surface. It also has a bottom and an upper periphery, a cavity 2, and a special retaining lip or flange 3A within the bowl. Image 3B is a cut-out side view of the bowl wall illustrating overhang of lip or flange. The bowl illustrated here for simplicity is round and has curved sides, but many configurations of a bowl could readily be utilized in achieving the purposes of the present invention. The inner cavity 2 need not be of any specific configuration except that it must successfully accommodate and coordinate with the size and configuration of the inserts 4 such that said inserts are held in close horizontal alignment with the bowl. The bowl 1 can be made of any substance that holds form. It should be made of a size, configuration, or material weight that prevents tipping of the bowl, and preempts the need for additional weights or adhesives to accomplish this end. It may have more than one cavity within it. The configuration of inner cavity 2 need not be determined or controlled by configuration of outer surface of bowl 1.

The inner cavity 2 has at or near top of said cavity a static, not mechanically operative, inwardly extending retaining lip or flange 3A that prevents exit of liners 4 from cavity except and unless removed intentionally by user of bowl 1. Additionally it prevents any movement of inserts. To achieve this retaining lip or flange 3A, the minor inside diameter of cavity 2, at or near its uppermost periphery, must be smaller in diameter than major diameter of bowl cavity 2 below it. The lip 3A is fixed in place and does not move during routine replacement or extraction of liners 4 from within said cavity. The retaining lip or flange can be built into bowl 1 as it is in preferred embodiment or it can be manufactured separately and snapped or pressed in to position as an alternative. The retaining lip 3A is so configured to also shield and protect subsequent liners below the top liner from the contamination by the stray spillage of food. The bowl also has a thumb notch 6 cut out at the top periphery of bowl 1 in order to allow the removal of liners 4 by simply peeling them off, and without having to incur the additional expense of adding tabs to all the liners.

The next major component of the system is the plurality of liners 4 that will hold the food. Each of the liners 4 is of the same configuration. This allows them to nest closely within each other in a stacked vertical array. Liners 4 may be of any configuration, design, and profile except that uppermost edge and outermost horizontal dimensions of said liner must match and cooperate with retaining lip or flange 3A as well as the inner size and configuration of the inner walls of the cavity 2 of bowl 1. The liners 4 may be of any material or coated material that is suitable for holding wet foods, dry foods or liquids without said foods or liquids adversely affecting unused liners in said cavity.

The compressive device 5 resides below stacked array of liners, and supports and raises stacked vertical array of liners 4 within cavity up to the limit imposed by retaining lip, whereby contained liners will always be available near top of bowl 1 and will continue to rise therein as each individual liner is disposed of. The compressive device 5 additionally holds the inserts with enough upward force against retaining lip 3A such that inserts cannot not move or spin during routine feedings. The compressive device 5 can be of any substance, structure or design that when compressed or deflected will seek to return to its original state and position by exerting an opposite pressure against that which compresses it or deflects it. This would include all manner of springs, living hinges, foams, rubber devices, elastics, and even inflated devices. In the preferred embodiment illustrated here, a simple cube of foam rubber is used to accomplish the desired effect.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Operation—FIG. 2

In operation and use, a plurality of liners are provided in a stacked relationship and then simply pushed down into the cavity 2 of the outer bowl 1, where they are so positioned that topmost liner may receive food to be eaten by the pet. The compressive device 5 exerts an upward force against the vertical array of liners 4 such that liners would pop out of cavity but for the opposite effect created by the retaining lip or flange 3A which prevents it.

Additionally the upward force created by the compressive device on the inserts 4 against the bottom side of retaining lip 3A prevents any movement of the inserts during a feeding. Prior to each new feeding, user of device can use thumb notch to grasp used liner and simply peel liner out of bowl 1. A new liner immediately positions itself in place and is held firmly in place to receive pet food. Additional liners will be available for purchase from manufacturer of device.

Advantages

In summary, it is the goal and object of the present invention to provide a new pet feeding device which will be recognized for its minimal cost, and maximum convenience, simplicity and user friendliness. It will require an absolute minimum of dexterity and wasted movement or effort to operate.

It is a further object of the present invention to provide a new pet feeding device which is of a durable and reliable construction, with no moving parts or other unnecessary structural complexities.

A still further object of the present invention is to provide a new pet feeding device which is of the lowest possible cost to manufacture, both in regard to engineering, materials and labor. In so doing the device would accordingly be then susceptible of lower sales price, thus making it more readily and economically available to the widest segment of the buying public. More specifically it is claimed that:

(a) The operation of my device represents a huge jump in ease and simplicity over previous devices referenced herein. Those devices all entail a three step process of releasing latches, opening retaining elements, removing an insert, and then reclosing all this same hardware. The invention disclosed herein is a one step process, identical in simplicity and ease of use to peeling a sheet of paper from a pad.

(b) The design of my device is ultra simple and obviates the need to engineer and develop separate retaining elements, hinges, latches, and anti-spin hardware. My device also does away with the entirely separate design and development effort as required for securing all this hardware to the outer bowl of their patents.

(c) The device I disclose herein represents a huge manufacturing advantage over previous devices. My bowl and its features are easily manufactured in a single step. The compressive device is easily cut from standard, cheap, widely available 1" foam. In the preferred embodiment of my device the retaining lip or flange is cast and built on to the bowl in the same process as the rest of the bowl. No separate efforts or costs are required for making this integral retaining lip or flange. Previous inventions require their retaining elements be built separately and then separately added to the bowls.

(d) Because of the markedly more simple design and manufacturing efforts required by the device I detail herein, said device must necessarily be cheaper to fabricate.

(e) As a consequence of the fewer manufacturing costs associated with the design I have disclosed, my invention can be marketed and sold at a price more favorable to consumers and the mass market, and thereby bring improved dietary choices to a larger segment of the domestic animal population.

(f) By eliminating the moving parts suggested in previous patents, the design presented herein will not be subject to the breakage or dysfunction, through wear or improper usage, which previous designs may be susceptible to. This speaks to greater reliability and longevity of the device proposed now.

I claim:

1. A pet feeding device, comprising:
   an outer bowl of uniform construction with a rim and an inner cavity that has a retaining ridge defined in at least a portion of the rim of the outer bowl which is of uniform construction;
   a compression device disposed within the inner cavity;
   a plurality of liners, wherein the plurality of liners are stacked and nested in a vertical array so that a rim of one of said liners defines the top of said vertical array and a base of another of said liners defines the bottom of said vertical array;
   wherein the plurality of liners are disposed within the inner cavity so that the bottom of the vertical array abuts the compression device;
   wherein the plurality of liners are confined in the inner cavity by the compression device exerting force between the inner cavity and the bottom of the vertical array while the top of the vertical array abuts the static retaining ridge,
   wherein movements of the plurality of liners are restricted by contact between the compression device and the bottom of the vertical array while the plurality of liners is confined within the inner cavity; and
   wherein the rim of the outer bowl has a thumb notch formed out of the fixed retaining ridge for easy removal of at least one liner.

2. The pet feeding devices of claim 1, wherein the outer bowl has two inner cavities that are positioned side-by-side.

3. The pet feeding device of claim 1, wherein the outer bowl is made of a material selected from the group consisting of metal, hard plastic, ceramic, and definable forms.

4. The pet feeding device of claim 1, wherein the inner cavity has a top portion comprising the fixed retaining ridge, wherein the fixed retaining ridge extends inwardly to restrict movement of the at least one liner and inadvertent removal of the at least one liner from the inner cavity unless removed intentionally.

5. The pet feeding device of claim 1, wherein the at least one liner is constructed of a material that is resilient yet pliable, wherein the material is configured to hold wet foods, dry foods or liquids without said foods or liquids adversely affecting unused liners in the inner cavity.

6. The pet feeding device of claim 1, wherein the rim of one of the plurality of liners has a width that is larger than a width of the rim of the outer bowl less the width of the retaining ridge.

7. The pet feeding device of claim 1, wherein the expanding force from said compression device will exert continued force on the base of the vertical array as each one of the at least one liner is removed from the inner cavity.

8. The pet feeding device of claim 1, wherein the compression device is constructed from a material selected from the group consisting of all manner of springs, living hinges, foams, rubber devices, elastics, and inflated devices, wherein when the compression device is compressed or deformed by the at least one liner, said compression device attempts to return to a neutral position by exerting a force opposite that of said at least one liner.

9. A method of providing food to an animal, comprising the steps of:
   Locating a bowl of uniform construction with a rim and an inner cavity that has a retaining ridge defined along the rim of said bowl and locating a separate compression device, wherein the retaining ridge is along a top edge of the inner cavity, wherein the compression device is disposed within the inner cavity, and wherein the bowl further comprises a thumb notch carved out of the retaining ridge;
   providing a first set of at least one liner with a rim, inserting the first set of at least one liner into the inner cavity to compress the compression device;
   expanding the compression device until the rim of the at least one liner abuts the retaining ridge; and,
   placing food on top of the first set of at least one liner.

10. The method of claim 9, wherein the bowl has a plurality of inner cavities in side-by-side arrangement.

11. The method of claim 9, wherein the bowl is made of a rigid material selected from the group consisting of metal, hard plastic, ceramic, and definable forms.

12. The method of claim 9, wherein the inner cavity is substantially cylindrical.

13. The method of claim 9, further comprising the step of shielding the remaining liners from stray spillage of food via the retaining ridge.

14. The method of claim 9, wherein the compression device is selected from the group consisting essentially of springs, living hinges, foams, rubber devices, elastics, and inflated devices.

15. The method of claim 9, further comprising the step of removing one of the at least one liner from the bowl.

16. The method of claim 15, further comprising the steps of:
   providing a second set of at least one liner when the last liner of the first set of at least one liner is removed from the bowl; and
   inserting the second set of at least one liner into the inner cavity to compress the compression device.

* * * * *